May 23, 1950 A. W. SEAR 2,509,017
MAGNETIC RECORDING APPARATUS
Filed March 21, 1945
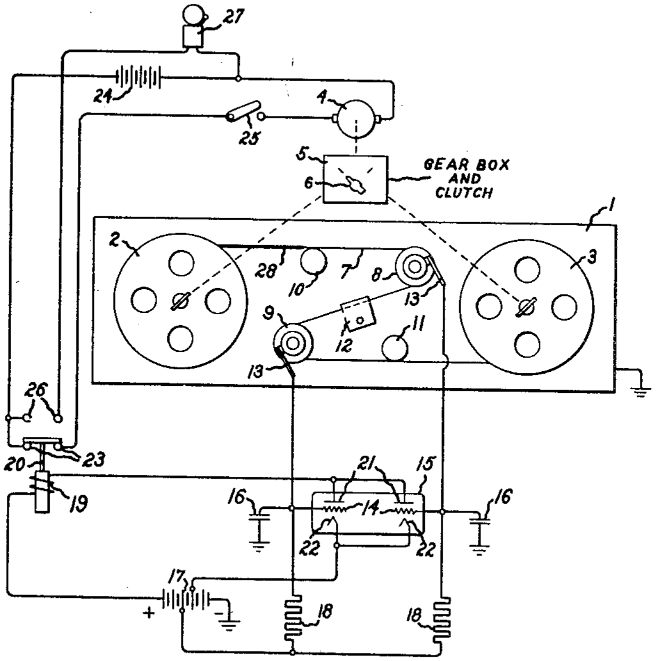
Inventor:
Arthur W. Sear
by Harry E. Dunham
His Attorney.

Patented May 23, 1950

2,509,017

UNITED STATES PATENT OFFICE 2,509,017

MAGNETIC RECORDING APPARATUS

Arthur W. Sear, Stratford, Conn., assignor to General Electric Company, a corporation of New York Application March 21, 1945, Serial No. 583,950

6 Claims. (Cl. 242—54)

This invention relates to magnetic recording apparatus and has for one object thereof the provision of a new and improved method and means for indicating a discontinuity in a traveling magnetic recording medium.

While not necessarily limited thereto, the invention is especially applicable to recording apparatus of the elongated traveling recording medium type, such as wire and tape recorders. Accordingly, it is a particular object of the invention to provide a new and improved method and means for indicating a break or other discontinuity in an elongated traveling magnetic recording medium, such as a wire or the like.

It is a still further object of my invention to provide a new and improved method and means for indicating the position of a distinctively marked portion of a traveling magnetic recording medium, such as the end thereof, and to provide means for distinguishing the two ends of a recording wire or the like, one from the other.

In accordance with my invention, a small electric current is passed through the portion of a traveling recording medium traversing a predetermined part of its path of travel, so that if, for any reason, the medium becomes non-conductive at that portion of its path of travel, such as by reason of a break or the presence of an insulated or non-conducting section of the medium, the normal current is interrupted or otherwise varied to give a suitable signal or indication. By signal or indication I mean any visible or audible alarm or the like, or the performance of a suitable control function such as interruption of the operation or the like.

My invention will be more fully understood by referring now to the following detailed specification taken in conjunction with the accompanying drawing, the single figure of which is a schematic diagram of a magnetic recording apparatus and control circuit embodying my invention.

Referring now to the drawing, I have shown a magnetic recording apparatus comprising a grounded metallic base 1 having mounted thereon a pair of wire reels 2 and 3 connected alternatively to be driven by an electric motor 4 through a suitable clutch and gear mechanism 5. The mechanism 5 is provided with a clutch control knob 6 arranged to connect the motor 4 either to the reel 2 or to the reel 3. The driven reel acts as a take-up reel, while the reel not connected to the motor serves as a supply reel, running idly or slightly braked. It will, of course, be understood that this driving arrangement is illustrative only, and that if desired a capstan or other suitable drive may be used.

An elongated magnetic recording medium, such as a wire 7, travels from the supply reel to the take-up reel over a pair of fixed pulleys 8 and 9. Preferably, suitable level winding mechanisms 10 and 11 are provided between the pulleys 8 and 9 and the reels 2 and 3, respectively. Between the pulleys 8 and 9, the wire 7 traverses a magnetic recording and reproducing head 12.

The recording and reproducing head 12 is constructed of magnetic material, such as iron or the like, and is in electrical contact with the base 1, so that the head 12 is maintained at ground potential. Preferably, the wire reels 2 and 3 are also metallic and are in electrical contact with the base, so that these reels also are at ground potential. The fixed pulleys 8 and 9 are formed of electric conducting material, but are insulated from the base. Thus, the pulleys 8, 9, the head 12, and the reels 2, 3 serve as electrodes making contact with the wire 7 at spaced points along its path of travel, the recording and reproducing head and the wire reels maintaining the wire at ground potential.

Each pulley 8 and 9 is provided with an electric contact arm or brush 13, and the brushes 13 are connected to the control grids 14 of a pair of three element electron discharge devices in a common envelope 15. It will of course be understood that, if desired, triodes having separate discharge envelopes may be employed. The control grids 14 are also connected to ground through a pair of capacitors 16 and to an intermediate point of positive potential on a battery or other suitable source of electric current supply through a pair of bias resistors 18. The negative terminal of the battery 17 is grounded and the positive terminal connected through the actuating winding 19 of a control relay 20 to the anodes 21 of the discharge device 15. The cathodes 22 of the discharge device 15 are connected together and to a point on the battery 17 positive with respect to ground, but negative with respect to the point of connection of the bias resistors 18.

The control relay 20 is provided with a pair of normally closed contacts 23 arranged to connect the motor 4 to a suitable source of electric current supply, such as a battery 24, through a control switch 25. The relay 20 is provided also with a pair of normally open contacts 26 arranged when closed to connect a suitable alarm device, such as a buzzer 27, to the battery 24.

In operation, when a continuous wire 7 is traversing its normal path of travel between the reels 2 and 2, the control grids 14 of the triodes in the discharge envelope 15 are both maintained at ground potential by connection through the brushes 13 and the pulleys 8 and 9 to the grounded wire 7. A voltage divider is thus formed by each of the resistors 18 and the respective associated portion of wire 7 between pulley 8 and grounded recording head 12 and between pulley 9 and the recording head. Control electrodes 14 are connected to intermediate taps or points on the respective voltage dividers, represented by the brushes 13 of the conductors connected thereto, and are maintained near ground potential due to the low resistance through wire 7 between the taps and ground. Each voltage divider is connected from a positive terminal of potential source 17 to ground. As long as the grids 14 are maintained substantially at or near ground potential by connection to the base 1 through the wire 7, the triodes in the envelope 15 are non-conductive, since the cathodes 22 are above ground potential. Normally, therefore, a negative cutoff bias is maintained on the grids 14 by connection to the wire 7. If, however, an electrical discontinuity in the wire, such as an insulated portion or a break, encounters one or the other of the pulleys 8, 9, the control grid connected to that pulley is isolated from ground and raised to the potential of the common positive ends of the bias resistors 18. This potential is positive with respect to the common cathode potential, so that the triode so affected will become conductive and pass sufficient current through the actuating winding 19 of the relay 20 to pick up the relay. When the relay 20 picks up, the motor 4 is disconnected from its supply source and the alarm device 27 energized, thereby to stop the reels 2, 3 and give an audible alarm.

In the embodiment of the invention herein described by way of illustration, the relay 20 will be energized when either one or both of the triodes in the discharge envelope 15 becomes conductive. In the case of a wire break, it will of course be understood that both triodes will become conductive substantially simultaneously.

The capacitors 16 preclude operation of the relay 20 in response to momentary contact breaks. It will be understood that upon a break in the contact of a brush 13 with ground the associated grid 14 can be raised in potential only as the capacitor 16 connected therewith is charged. The time constant of the charging circuit including the associated resistor 18 therefore determines how long contact must be broken at the brush 13 before the associated discharge device is rendered conductive.

My invention may also be utilized to provide limit stops for the motor 4 as the ends of the wire are approached. For this purpose, the wire 7 may be provided at its ends with insulated sections 28, such as by coating with varnish or the like. If desired leaders of non-conductive material may be connected to the ends of the wire. When such an insulated section encounters one of the pulleys 8, 9, the associated triode in the discharge envelope 15 becomes conductive in the manner hereinbefore described, thereby to energize the relay 20 and stop the motor 4. The non-conducting end sections may be colored differently to identify the ends of the wire. Thus, it will be evident by inspection whether a reel is ready for reproduction or must first be rewound.

For the purpose of illustration, I have chosen the above embodiment of my invention wherein current is normally conducted between two pairs of electrodes along spaced portions of the wire 7, as between each pulley 8, 9 and the common grounded recording and reproducing head 12. By this arrangement, indication is obtained as soon as a discontinuity encounters either of the pulleys and interrupts either of the currents. It will of course be understood by those skilled in the art that, if desired, current may be passed through only a single portion of the wire 7 between a single pair of electrodes, and that it is not necessary to ground any of the electrodes but merely to maintain a potential difference between them.

Accordingly, therefore, while I have illustrated only a preferred embodiment of my invention, many modifications will occur to those skilled in the art and I therefore wish to have it understood that I intend in the appended claims to cover all such modifications as fall within the true spirit and scope of my invention.

What I claim as new and desire to secure by Letters Patent of the United States, is:

1. A magnetic recording apparatus comprising a reversible traveling magnetic recording medium, and signalling means operable in response to an electrical discontinuity in said medium comprising a plurality of fixed electrodes spaced apart along the path of travel of said medium and arranged in electric conducting relation therewith, means for continuously conducting electric current along separate paths through said medium between each of two pairs of said electrodes, and means responsive to the interruption of current flow along either of said paths to operate said signalling means.

2. A magnetic recording apparatus comprising a reversible traveling magnetic recording medium, and signalling means operable in response to an electrical discontinuity in said medium including a pair of spaced apart fixed electrodes and an intermediate common electrode arranged in electric conducting relation with said medium along its path of travel, means for continuously conducting electric current between each of said spaced electrodes and said common electrode, and means responsive to interruption of current flow from either of said spaced electrodes to operate said signalling means.

3. In a magnetic recording apparatus including a traveling magnetic recording medium, an electron discharge device having a cathode and a control electrode, and voltage divider means including a resistive element in series with a fixed length of said record medium between spaced points in its path of travel with said control electrode connected to a point on said voltage divider arranged to reverse the potential of said control electrode with respect to said cathode in response to an electrical discontinuity in said medium between said spaced points.

4. In a magnetic recording apparatus including an elongated traveling magnetic recording medium, an electron discharge device having a cathode and a control electrode, a pair of spaced apart fixed electrodes normally in electric conducting relation with said recording medium at predetermined points in its path of travel, a source of potential having a grounded terminal, resistive element connected to said source at one terminal and having another terminal connected to said control electrode and through said fixed electrodes and the included portion of said recording medium to ground thereby abruptly to change the bias potential applied to said control electrode in response to an electrical discontinuity of said recording medium between said fixed electrodes, and means controlled by said discharge device for indicating such discontinuity.

5. In a magnetic recording apparatus including an elongated traveling magnetic recording medium having non-conducting end sections, a reversible motor for driving said medium, a pair of electron discharge devices having cathodes and control electrodes, and separate voltage divider means associated with said control electrodes and including separate portions of said recording medium between fixed points in its path of travel, each said voltage divider means being arranged significantly to change the bias potential of one of said control electrodes in response to an electrical discontinuity in the associated portion of said medium, and means severally controlled by said discharge devices for disabling said motor.

6. In a magnetic recording apparatus including an elongated traveling magnetic recording medium, an electron discharge device having a cathode and a control electrode, a pair of spaced-apart fixed electrodes normally in electric conducting relation with said recording medium at predetermined points in its path of travel, a source of potential having a grounded terminal, a resistive element connected to said source at one terminal and having another terminal connected to said control electrode and through said fixed electrodes and the included portion of said recording medium to ground thereby abruptly to change the bias potential applied to said control electrode in response to an electrical discontinuity of said recording medium between said fixed electrodes, means controlled by said discharge device for indicating such discontinuity, and a capacitor connected between said control electrode and ground to prevent actuation of said indicating means in response to a momentary discontinuity in said medium.

ARTHUR W. SEAR.

REFERENCES CITED

The following references are of record in the file of this patent:

UNITED STATES PATENTS

| Number | Name | Date |
|---|---|---|
| 909,414 | Hytten | Jan. 12, 1909 |
| 1,915,113 | Wood et al. | June 20, 1933 |
| 1,939,181 | McCash et al. | Dec. 12, 1933 |
| 1,977,697 | Rockwood | Oct. 23, 1934 |
| 2,032,176 | Kovalsky | Feb. 25, 1936 |
| 2,146,869 | White | Feb. 14, 1939 |
| 2,351,005 | Camras | June 13, 1944 |